United States Patent Office 2,846,330
Patented Aug. 5, 1958

2,846,330

WAX COMPOSITIONS

Erich Berthold, Hans Hoyer, and Guido von Rosenberg, Gersthofen, Germany, assignors to Farbwerke Hoechst Aktiengesellschaft vormals Meister Lucius & Bruning, Frankfurt am Main, Germany, a corporation of Germany No Drawing. Application December 31, 1954
Serial No. 479,213

Claims priority, application Germany December 31, 1953

8 Claims. (Cl. 106—268)

The present invention relates to compositions of wax, fatty acid esters and fatty acid salts.

It is known to prepare and use waxes containing, in addition to the esters of the acids obtained by chromic acid oxidation of montana wax, calcium salts of the said acids. Such waxes are used in the first place for the manufacture of shoe creams and floor waxes. The high capability of these products to absorb oil and, resulting therefrom, their tendency to form very hard pastes with solvents are sometimes desired. In many cases, however, pastes having a salvy consistency but containing a high portion of hard ester waxes are preferred, since such salvy pastes can be worked up with special advantage.

It is further known to add to the wax pastes salts from the fatty acids of the metals magnesium, zinc or aluminum. These metals exert, in fact, a softening action. When using such additions, utmost care must, however, be taken that the pastes do not unmix and thus fall off in quality so that they no longer meet the requirements. By proceeding in this manner, it is also difficult to obtain a paste having the lasting and fine high gloss desired in industry.

In order to obtain soft pastes, waxes have been prepared from mixtures of esters containing on the one hand esters of polyhydric alcohols with wax acids obtained by chromic acid oxidation of montana wax and on the other hand esters of these alcohols with fatty acids containing 12 to 22 carbon atoms. The resulting waxes are, however, relatively soft and the pastes obtained therefrom with the use of solvents and hard waxes are not sufficiently salvy.

Now we have found that waxes comprising a mixture of esters of at least one polyhydric alcohol with montana acids on the one hand, said acids being obtained by oxidation of montana wax, and with fatty acids on the other hand, said acids containing at least 12 and at most 22 carbon atoms, and calcium salts of the said acids and furthermore, the magnesium salts and/or zinc salts and/or aluminum salts of the said acids, can be worked up to yield soft and salvy oil pastes having a high content of ester waxes. The pastes so obtained have a particularly fine and extremely lasting surface gloss which is superior to that of the wax pastes hitherto known and greater than the total of the properties of the individual components suggested.

The mixtures can be obtained, for example, by esterifying a mixture of the fatty acids and the montana wax acids either simultaneously or, gradually, the latter particularly when various alcohols are used, and then partially saponifying, simultaneously or gradually, with calcium compounds and, if desired, with compounds of the second metal or adding the above mentioned salts of the second metal. It is, however, also possible to mix the finished esters and then to saponify them as described above. Further methods of preparing the mixture are obvious to those skilled in the art.

When the individual components shall be admixed, the mixing may be carried out in the presence of solvents, for example benzine or turpentine oil, and it is not necessary to separate the wax components before they are finally worked up to yield, for example shoe creams or floor waxes.

The preferred ratio of wax acids to fatty acids is between 75 and 97 parts of wax acids and 25 and 3 parts of fatty acids, a ratio between 85 and 96 parts of wax acids and 15 and 4 parts of fatty acids being especially advantageous. The metal content generally ranges from 0.5 percent to 10 percent, preferably from 1 percent to 5 percent, calculated upon the total amount of the partially saponified mixture of esters. The ratio of calcium and the second metal may be chosen at will, the preferred ratio lying within the range from 1:5 to 5:1.

Among the salts mentioned above zinc salts are of special advantage.

Particularly suitable acid components are, beside the oxidation products of montana wax having an acid number from about 120 to 160, the fatty acids containing 12 to 22 carbon atoms, either saturated or containing one olefinic bond, for example lauric acid, myristic acid, pentadecylic acid, palmitic acid, margaric acid, oleic acid, arachidic acid or behenic acid or the mixtures thereof, for example coconut oil fatty acid or palm kernel fatty acid. Among these are particularly suitable the even-numbered fatty acids within the range mentioned above. If desired, there may also be used branched fatty acids for example in mixtures, of even-numbered and/or un-even-numbered fatty acids as they are obtained in the paraffin oxidation. Among the oxidation products of montana wax, the oxidation products obtained with chromic acid are especially suitable. There may, however, be used other oxidation products, for instance those obtained by nitric acid oxidation.

For the esterification there can be used, for example, the following polyhydric alcohols: ethylene glycol, propane diols, glycerol, dihydric and polyhydric alcohols containing 4 to 6 carbon atoms, such as sorbitol or pentaerythritol, or mixtures of such alcohols.

The wax compositions obtained according to the invention, are worked up in known manner, for example to yield shoe creams or floor waxes, i. e., besides solvents such as benzine, turpentine oil or its equivalents, other waxes may be added, for example carnauba wax, candelilla wax, ouricoury wax, beeswax, crude montana wax, refined or purified crude montana wax, microcrystalline waxes, ozokerites, paraffins, resins, dyestuffs, filling materials, abrasives, odorous substances, insecticides, bactericides or other substances suitable for the manufacture of wax preparations on the basis of solvents.

The following examples serve to illustrate the invention but they are not intended to limit it thereto, the parts being by weight:

*Example 1*

100 parts of a mixture of 8 parts of coconut fatty acid and 92 parts of a chromic acid oxidation product of crude montana wax of an acid number of about 150 are esterified with butanediol-1.3 in known manner. The resulting mixture is subsequently saponified up to an acid number of about 10 by addition of anhydrous calcium hydroxide. Into the melt of this product 7 parts of magnesium stearate are introduced at 100° C. and the whole is stirred until the melt is completely homogeneous. The product is then worked up in the usual manner, for example by pouring it into dishes or discharging it by way of a cooled roller. A light-colored hard wax of the following characteristic numbers is obtained: flowing point: 90° C., acid number: 18, saponification number: 117.

The wax so obtained produces an excellent gloss and binds solvents very well.

The wax may also be worked up directly as follows: 2.0 parts of crude montana wax and 1.0 part of beeswax are introduced into 11.5 parts of the molten wax. 0.1 part of a brown dyestuff soluble in fat is dissolved in the melt. 20 parts of fully refined cake paraffin of a flowing point of 52° C.–54° C. and 0.5 part of ozokerite melting at about 70° C. are added and melted together, while stirring. The melt is cooled until portions of wax begin to separate and then poured in the usual manner into containers for delivery. A brown shoe cream of a pliable consistency is obtained, which has an excellent and lasting high gloss. The product is convenient to use and leaves behind a brilliant wax film.

When proceeding in the same manner but using for the esterification instead of butanediol-1.3, ethanediol-1.2 or a mixture of these alcohols, waxes of similar properties are obtained.

*Example 2*

100 parts of an oxidized montana wax having an acid number of about 160 are esterified in the usual manner with butanediol-1.3. Into the mixture so obtained 8 parts of palm kernel fatty acid are introduced at 95° C.–100° C. and the whole is stirred until the dissolution is complete. The mixture is then saponified with calcium hydroxide as described in Example 1, 8 parts of zinc stearate are added and stirring is contained until the dissolution is complete. The hot melt is worked up as usual, for example poured into dishes or formed into flakes by way of a cooled roller. A light colored hard wax is obtained (flowing point: 99° C.– 100° C., acid number: 18, saponification number: 114).

A product of similar properties is obtained by esterifying, analogous to Example 1, the mixture of oxidized montana wax together with palm kernel fatty acid, subsequently saponifying the mass and admixing zinc stearate.

When, instead of palm kernel fatty acid, other fatty acids, such as stearic acid, palmitic acid, arachidic acid or behenic acid, or the mixtures of these acids are used, waxes of equally valuable properties are obtained. Instead of butanediol-1.3, other polyhydric alcohols, for example ethanediol-1.2, propanediol-1.2, glycerol, butanediol-1.4 or the like or the mixtures thereof may be used for the esterification.

The waxes so obtained can be worked up, for example, as follows: 7 parts of a wax obtained as described above are melted together with 0.5 part of beeswax, 1.0 part of ozokerite melting at about 70° C. and 24 parts of fully refined cake paraffin melting at 52° C.–54° C. The clear melt is cooled to about 80° C. A mixture of 20 parts of turpentine oil and 50 parts of test benzine is slowly added, while taking care that no separation occurs. The solution so obtained is cooled to about 40° C. and then poured in known manner into containers generally used for delivery. A pliable wax paste is obtained which is distinguished by an excellent high gloss. The product can be used, for example, as floor wax, furniture polish or leather dressing.

*Example 3*

A mixture of 10 parts of palm kernel fatty acid and 90 parts of a product obtained by chromic acid oxidation of montana wax and having an acid number of 145 is esterified in known manner with butanediol-1.3. The mixture so obtained is saponified first with calcium hydroxide up to an acid number of 25 and then with magnesium acetate up to an acid number of about 12. The acetic acid formed during this procedure is discharged. A cream-colored hard wax is obtained.

Instead of magnesium acetate, there may be used zinc stearate and instead of palm kernel fatty acid there may be used mixtures of other fatty acids containing 12 to 22 carbon atoms, for example mixtures of fatty acids obtained by paraffin oxidation.

The waxes so obtained can be worked up, for example, as follows:

6 parts of a wax obtained as described above are melted together with 2 parts of a wax containing calcium salt and obtained by esterifying with butanediol-1.3 the chromic acid oxidation product of montana wax. About 0.05 part of a brown dyestuff soluble in fat is introduced into the melt, while stirring well. After the dyestuff has entered into solution, 2 parts of ozokerite melting at about 70° C. and 18 parts of paraffin are added. A mixture of 36 parts of test benzine and 36 parts of turpentine oil is slowly added to the homogeneous melt at about 70° C., while taking care that no separation occurs. The solution is then cooled to about 40° C. and poured out as usual. After cooling, a cream of a soft and salvy consistency is obtained which can be used, for example, as shoe cream, automobile polish or leather dressing. The paste is distinguished by an excellent surface gloss and possesses very good gloss-producing properties.

*Example 4*

A mixture of 6 parts of coconut fatty acid and 94 parts of a montana product of an acid number of 156 which has been obtained by chromic acid oxidation of montana wax is esterified with butanediol-1.3 and saponified with calcium hydroxide as described in Example 1. 6 parts of zinc montanate are then introduced into the melt and the whole is stirred until the dissolution is complete. A light-colored hard wax is obtained (melting point: 98° C., acid number: 13, saponification number: 118).

The product shows properties similar to those of the wax described in Example 1 and can be worked up into a paste in a manner analogous to Example 1.

Instead of zinc montanate, other salts, for example zinc stearate or aluminum stearate may successfully be used.

We claim:

1. A wax composition comprising a homogeneous mixture which contains (a) a high content of ester reaction products of at least one polyhydric alcohol and a mixture of montanic acid and at least one fatty acid having from 12 to 22 carbon atoms and (b) small proportions of calcium salts of said acids and the salts of at least one of said acids in which the cation is selected from the group consisting of zinc, magnesium, aluminum and mixtures thereof, the total metal content, calculated as free metal, not exceeding 5% based on the weight of the ester reaction products, the ester producing mixture of montanic acid and fatty acids being in the ratio of from 75 to 97 parts by weight of montanic acid to 25 to 3 parts by weight of fatty acid.

2. A wax composition as claimed in claim 1, wherein the ester producing mixture of montanic acid and fatty acid is in the ratio of from 85 to 96 parts by weight of montanic acid to 15 to 4 parts by weight of fatty acid.

3. A wax composition as claimed in claim 1, wherein the total metal content, calculated as free metal is from 0.5 to 5 percent, based upon the weight of the ester reaction products.

4. A wax composition as claimed in claim 1, wherein the total metal content, calculated as free metal is from 1 to 5 percent, based upon the weight of the ester reaction products.

5. The composition of claim 1 in which the montanic acid has an acid number of about 120 to about 160 and the fatty acids contain at the most one olefinic bond.

6. The composition of claim 1 in which the polyhydric alcohol contains from 2 to 6 carbon atoms.

7. The composition of claim 1 in which the weight ratio, calculated as free metal, between the metal selected from said group and calcium is in the range of from 5:1 to 1:5.

8. A wax composition comprising a homogeneous mixture of a major amount of ester reaction products of at least one polyhydric alcohol having from 2 to 6 carbon atoms and a mixture of montanic acid of an acid number from about 120 to 160 and at least one fatty acid having from 12 to 22 carbon atoms and containing at most one double bond, and minor proportions of calcium salts of said acids and the salts of at least one of said acids in which the cation is selected from the group consisting of zinc, magnesium, aluminum and mixtures thereof, the ester producing mixture of montanic acid and fatty acids being in the ratio of from 75 to 97 parts by weight of montanic acid to 25 to 3 parts by weight of fatty acid, the total metal content, calculated as free metal, being within the range of 0.5 to 5 percent based upon the weight of the ester reaction products and the weight ratio, calculated as free metal, between the metal selected from said group and calcium being within the range of from 5:1 to 1:5.

References Cited in the file of this patent

UNITED STATES PATENTS

| | | |
|---|---|---|
| 1,901,374 | Luther et al. | Mar. 14, 1933 |
| 2,322,198 | Parsons | June 15, 1943 |
| 2,374,474 | Dolian | Apr. 24, 1945 |
| 2,446,849 | Price et al. | Aug. 10, 1948 |
| 2,586,780 | Beuer et al. | Feb. 26, 1952 |
| 2,614,049 | Swanson | Oct. 14, 1952 |

FOREIGN PATENTS

| | | |
|---|---|---|
| 296,145 | Great Britain | Mar. 9, 1928 |